United States Patent
Eriksson et al.

(10) Patent No.: US 10,499,378 B2
(45) Date of Patent: Dec. 3, 2019

(54) METHOD AND NETWORK NODE FOR HANDLING A FEEDBACK PROCEDURE

(71) Applicant: Telefonaktiebolaget LM Ericsson (publ), Stockholm (SE)

(72) Inventors: Erik Eriksson, Linköping (SE); Martin Hessler, Linköping (SE); Osman Nuri Can Yilmaz, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 169 days.

(21) Appl. No.: 15/514,905

(22) PCT Filed: Sep. 29, 2014

(86) PCT No.: PCT/EP2014/070770
§ 371 (c)(1),
(2) Date: Mar. 28, 2017

(87) PCT Pub. No.: WO2016/050260
PCT Pub. Date: Apr. 7, 2016

(65) Prior Publication Data
US 2017/0238307 A1   Aug. 17, 2017

(51) Int. Cl.
*H04W 24/00* (2009.01)
*H04W 72/04* (2009.01)
(Continued)

(52) U.S. Cl.
CPC ...... *H04W 72/0413* (2013.01); *H04B 17/336* (2015.01); *H04L 1/1607* (2013.01);
(Continued)

(58) Field of Classification Search
CPC ... H04L 1/1887; H04L 1/0009; H04L 1/0018; H04L 1/0021; H04L 1/1685;
(Continued)

(56) References Cited

U.S. PATENT DOCUMENTS 6,658,619 B1  12/2003  Chen
2002/0142791 A1*  10/2002  Chen ................. H04W 52/241
                                                       455/522

(Continued)

FOREIGN PATENT DOCUMENTS

EP   1626518 A2   2/2006

*Primary Examiner* — Un C Cho
*Assistant Examiner* — Rasha K Fayed
(74) *Attorney, Agent, or Firm* — Patent Portfolio Builders, PLLC

(57) ABSTRACT

A method and a network node, for handling a feedback procedure requiring transmission of feedback messages on a reverse link to indicate either an ACK or a NACK of correct reception of data transmitted on a forward link in a radio communication with a wireless device. The network node obtains (300) a quality of the forward link and determines (302) an expected data error rate on the forward link based on the quality of the forward link. The network node then assigns (306) radio resources on the reverse link for transmission of the feedback messages based on the expected data error rate, so that more radio resources are assigned for the reverse link when the expected data error rate is relatively high than when the expected data error rate is relatively low. Thereby, the amount of radio resources on the reverse link can be adapted to the expected data error rate such that any waste of radio resources to no avail can be reduced.

18 Claims, 6 Drawing Sheets

(51) Int. Cl.
*H04L 1/16* (2006.01)
*H04L 1/18* (2006.01)
*H04L 1/20* (2006.01)
*H04L 5/00* (2006.01)
*H04B 17/336* (2015.01)

(52) U.S. Cl.
CPC .......... *H04L 1/1812* (2013.01); *H04L 1/1825* (2013.01); *H04L 1/1893* (2013.01); *H04L 1/1896* (2013.01); *H04L 1/203* (2013.01); *H04L 5/0055* (2013.01); *H04W 72/042* (2013.01)

(58) Field of Classification Search
CPC ... H04L 1/1809; H04L 1/1825; H04L 1/1867; H04L 1/1877; H04L 1/0002; H04L 1/0026; H04L 1/1671; H04L 1/1614; H04L 1/1832; H04L 1/16; H04L 1/18; H04L 1/00; H04L 1/1829; H04L 47/10; H04L 47/14; H04L 47/263; H04L 12/56; H04L 12/16; H04L 12/28; H04L 29/08; H04W 52/16; H04W 52/226; H04W 52/06; H04W 52/40; H04W 52/221; H04W 52/26; H04W 52/58; H04W 52/60; H04W 52/143; H04W 52/146; H04W 52/50; H04W 52/44; H04W 28/22; H04W 28/04; H04W 28/08; H04W 72/085; H04W 72/04; H04W 72/12; H04W 72/1226; H04W 72/0426; H04W 72/042; H04W 72/0486; H04W 24/00; H04W 24/10; H04W 16/14; H04W 74/00; H04W 36/18; H04B 17/318; H04B 17/336; H04B 7/022; H04B 7/26
USPC .......................... 370/329, 242, 389, 476, 340
See application file for complete search history.

(56) References Cited

U.S. PATENT DOCUMENTS

| | | | |
|---|---|---|---|
| 2003/0134655 A1* | 7/2003 | Chen | H04L 12/1877 455/522 |
| 2004/0160914 A1* | 8/2004 | Sarkar | H04W 72/1226 370/329 |
| 2004/0203991 A1* | 10/2004 | Chen | H04B 7/022 455/522 |
| 2006/0034277 A1* | 2/2006 | Jang | H04L 1/1614 370/389 |
| 2007/0178927 A1* | 8/2007 | Fernandez-Corbaton | H04W 52/343 455/522 |
| 2007/0191044 A1* | 8/2007 | Kostic | H04W 52/12 455/522 |
| 2011/0242990 A1* | 10/2011 | Simonsson | H04W 72/085 370/242 |

* cited by examiner

METHOD AND NETWORK NODE FOR HANDLING A FEEDBACK PROCEDURE

TECHNICAL FIELD

The present disclosure relates generally to a method and a network node of a radio network, for handling a feedback procedure requiring transmission of feedback messages in a radio communication with a wireless device. The feedback procedure may be applied according to a Hybrid Automatic Repeat Request, HARQ, process.

BACKGROUND

For some years, different types of radio networks for wireless communication have been developed to provide radio access for various wireless terminals in different areas. The radio networks are constantly improved to provide better coverage and capacity to meet the demands from subscribers using increasingly advanced services and terminals, e.g. smartphones and tablets, which may require considerable amounts of bandwidth and resources for data transport in the networks. A limiting factor for capacity of a radio network is the amount of available radio resources, e.g. in terms of time, frequency bandwidth and transmit power, and the capacity of a radio network is improved by more efficient usage of such radio resources.

In the field of mobile or wireless communication, the term "wireless device" is often used and will be used in this disclosure to represent any communication entity capable of radio communication with a radio network by sending and receiving radio signals, such as e.g. mobile telephones, tablets and laptop computers. Another common term in this field is "User Equipment, UE". A wireless device in this context could also be a machine-to-machine type of device operating automatically such as a sensor, counter or measuring entity which is configured to send reports over the radio network e.g. at certain intervals or upon certain events. Further, the term "network node", is used here to represent any node of a radio network that is arranged to communicate radio signals with wireless devices. The network node in this context is sometimes also referred to as a base station, radio node, e-NodeB, eNB, NB, base transceiver station, access point, etc.

It is becoming increasingly common to employ so-called "Machine-to-Machine", M2M, devices which are typically installed at certain locations to operate automatically by sending and receiving data according to a predefined behavior. For example, equipment and procedures have been developed for monitoring various locations, areas and functions that need to be supervised, where M2M devices can be installed at different locations within a monitored area to perform some predefined operational task such as measuring, counting, detecting or sensing, and typically reporting the result to a central server or the like. These devices may be configured to measure or observe some metric or parameter of interest, such as temperature, pressure, voltage, battery level, light, motion, sound, presence of objects, presence of smoke, to mention a few illustrative examples.

Some common examples of M2M device installations include public and private buildings, infrastructures, vehicles, industrial premises, machines, communication networks, and so forth. The devices may use radio access over a radio network to report sensor data comprising information about their measurements and observations to the server, e.g. at regular intervals or triggered by occurrence of an event, e.g. detection of motion, sound, vibration, light, smoke, temperature rise, and so forth. The server may further send various commands and instructions back to the devices to control their operation.

An example of an arrangement for monitoring a particular area is schematically illustrated in FIG. 1 where a plurality of M2M devices "D" are distributed at different locations within a schematically shown monitored area 100, the devices D being configured to perform various measurements and observations at their respective locations and to send reports over a radio network 102 to a central monitoring server 104, as indicated by arrows "R". The server 104 may also send various commands to control operation of the devices D, as indicated by opposite arrows "C".

As mentioned above, it is of interest for network operators to improve capacity in their networks by utilizing the available radio resources as efficiently as possible. Another area of interest is to ensure reliability when data is transmitted to or from the wireless devices, e.g. M2M devices, so that no errors occur in the information communicated, if this is deemed important. This can be achieved by adding extra control bits in the transmission which can be used for error correction and/or for checking that there is no error in the received data, e.g. after make an attempt at error correction. A common method for error detection is the well-known Cyclic Redundancy Check, CRC, where basically a sum of the transmitted data may be checked.

If a data receiving node determines, e.g. by using CRC or other error detecting method, that data has not been received correctly from a data sending node, it may send an error indicating message back to the data sending node which then may send the same data once again to the data receiving node, referred to as retransmission. A commonly used process for enabling retransmissions of erroneously received data is the well-known Hybrid Automatic Repeat Request, HARQ, process. Retransmissions may be employed if it is important that the data is correct when received, such as in M2M reporting of measurements and observations. On the other hand, a certain amount of errors can normally be tolerated in speech or video data and retransmissions may in that case not be motivated.

The HARQ process or similar generally requires a node receiving data from another node to indicate whether a transmitted chunk of data has been properly received and decoded or not, by sending a feedback message to the data sending node. In this context, the term "forward link" refers to the link used for conveying data and the term "reverse link" refers to the link used for conveying feedback messages.

FIG. 2 illustrates a simple example of how this is basically done. In a first action 2:1, a data sending node denoted data sender 200 transmits a piece of data on a forward link to a data receiving node denoted data receiver 202. The data sender 200 may be a network node and the data receiver 202 may be a wireless device, or vice versa, and this procedure may be applied in either direction. Having received the data, the data receiver 202 checks if the data has any errors, e.g. by using the above-mentioned CRC for error detection, in another action 2:2. The data receiver 202 then returns a feedback message accordingly on a reverse link to data sender 200, in a next action 2:3.

The feedback message is either an acknowledgement, ACK, which confirms correct reception of the data, or a non-acknowledgement, NACK, which indicates an error in the received data or no reception at all, depending on the outcome of action 2.2 When receiving a NACK, the data sender 200 is required to retransmit the same chunk of data, as indicated by an optional action 2:4, to enable another attempt of reception and decoding at the data receiver 202. The HARQ process is widely known as such in this field and it is not necessary to describe in any further detail to understand the following disclosure. It should be understood that a certain amount of radio resources must be allocated for enabling the above-described communication of feedback messages. Even though the indication of ACK or NACK as such requires only one bit, 1 or 0, for each feedback message, a considerable amount of overhead is needed apart from that bit to enable this process.

However, it is a problem that considerable amounts of radio resources may be spent to no avail regardless of whether a feedback procedure such as the above-described HARQ process is employed or not. For example, when a feedback procedure is employed, a certain amount of extra radio resources must be allocated on the reverse link which may be a waste of radio resources in case the radio conditions are good and there are virtually no errors in the data communication, still requiring the data receiver to keep sending the feedback messages.

On the other hand, if no feedback procedure is employed, thus not requiring any extra radio resources, it is necessary to ensure that no data errors occur for applications where the data receiving node is very error-sensitive and requires correct data reception. This may be achieved by using a relatively large amount of radio resources for the data transmission on the forward link, e.g. by employing added error correction bits and/or high transmit power, to ensure correct data reception even when the radio conditions are bad. In order to ensure this, the radio resources for data must be dimensioned for a "worst-case scenario", which may require something like 10 times more radio resources than what is normally needed for about, say, 99% of the time. Therefore, large amounts of radio resources will often be occupied to no avail here as well. It is thus a problem to increase efficiency by avoiding waste of radio resources in data communications between a network node and a wireless device, and at the same time achieve sufficient reliability in the data communications.

SUMMARY

It is an object of embodiments described herein to address at least some of the problems and issues outlined above. It is possible to achieve this object and others by using a method and a network node as defined in the attached independent claims.

According to one aspect, a method is performed by a network node of a radio network, for handling a feedback procedure requiring transmission of feedback messages on a reverse link to indicate either an acknowledgement, ACK, or a non-acknowledgement, NACK, of correct reception of data transmitted on a forward link in a radio communication with a wireless device. In this method, the network node obtains a quality of the forward link, and determines an expected data error rate in reception of the data on the forward link based on the quality of the forward link. The network node then assigns radio resources on the reverse link for transmission of the feedback messages based on the expected data error rate, so that more radio resources are assigned for the reverse link when the expected data error rate is relatively high than when the expected data error rate is relatively low. Thereby, any waste of radio resources to no avail can be avoided or reduced since the amount of radio resources on the reverse link will be adapted to the expected data error rate.

According to another aspect, a network node of a radio network is arranged to handle a feedback procedure requiring transmission of feedback messages on a reverse link to indicate either an acknowledgement, ACK, or a non-acknowledgement, NACK, of correct reception of data transmitted on a forward link in a radio communication with a wireless device. The network node comprises a processor and a memory, said memory comprising instructions executable by said processor whereby the first node is operative to obtain a quality of the forward link, and to determine an expected data error rate in reception of the data on the forward link based on the quality of the forward link. The first node is further operative to assign radio resources on the reverse link for transmission of the feedback messages based on the expected data error rate, so that more radio resources are assigned for the reverse link when the expected data error rate is relatively high than when the expected data error rate is relatively low.

In another aspect, the network node comprises an obtaining module configured to obtain a quality of the forward link, a determining module configured to determine an expected data error rate in reception of the data on the forward link based on the quality of the forward link, and an assigning module configured to assign radio resources on the reverse link for transmission of the feedback messages based on the expected data error rate, so that more radio resources are assigned for the reverse link when the expected data error rate is relatively high than when the expected data error rate is relatively low.

The above method and network node may be configured and implemented according to different optional embodiments to accomplish further features and benefits, to be described below.

A computer program is also provided comprising instructions which, when executed on at least one processor, cause the at least one processor to carry out the above method. A carrier is also provided which contains the above computer program, wherein the carrier is one of an electronic signal, optical signal, radio signal, or a non-tangible computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
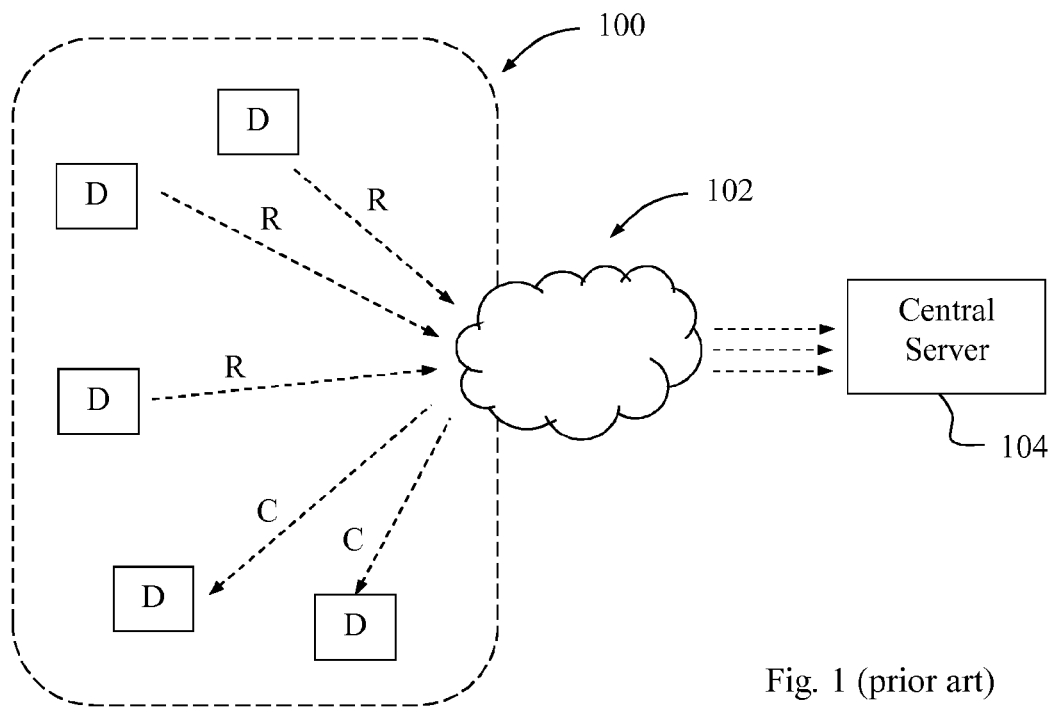
FIG. 1 is a communication scenario illustrating that wireless M2M devices communicate with a central server, according to the prior art.
Figure 2:
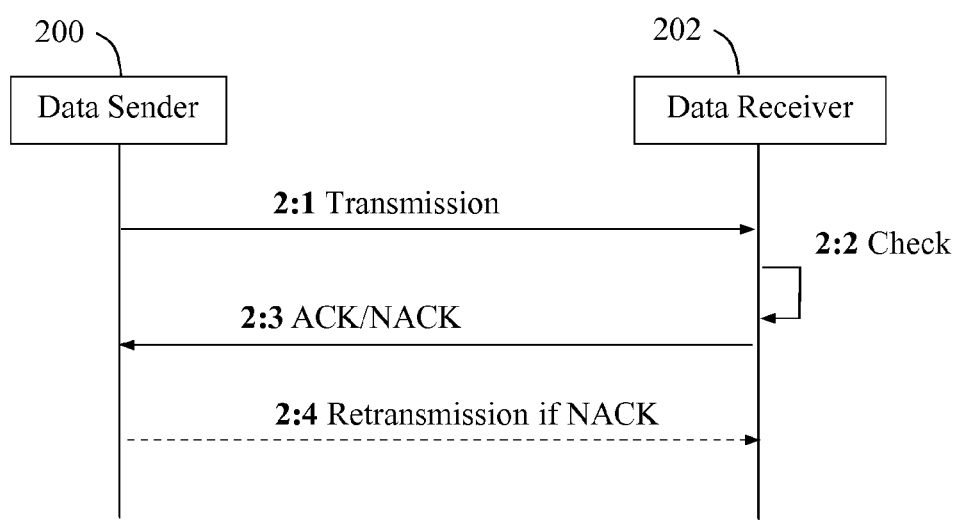
FIG. 2 is a signaling diagram illustrating a basic HARQ process, according to the prior art.

The following description will refer to a data sending node which transmits data on a forward link and a data receiving node which receives, or at least should receive, the transmitted data. The data receiving node is further required to send feedback messages on a reverse link to the data sending node, basically as described for FIG. 2 above. As mentioned above, the data sending node may be a network node or a wireless device and the data receiving node may be a wireless device or a network node, depending on whether the forward link is downlink or uplink, and this solution may thus be applied for data communication in either direction. The solution can and will also be described in terms of a network node and a wireless device without specifying the direction of data communication. Throughout this description, the forward link may alternatively be denoted data link and the reverse link may alternatively be denoted feedback link.

In this solution, it has been recognized that the error rate on the reverse link is dependent on the amount of radio resources assigned for feedback messages such that the error rate is low for a large amount of radio resources, and vice versa, meaning that using a large amount of radio resources for the reverse link will help to ensure correct reception of the feedback messages. It has further been recognized that unnecessary occupation of radio resources can be avoided by assigning a relatively small amount of radio resources for feedback messages if the forward link is of sufficiently high quality such that retransmissions are not likely to be required. In this case it is not deemed crucial to get across the feedback messages since a very low and acceptable error rate can be achieved on the forward link anyway even if a few feedback messages with NACK would not be received on the reverse link correctly. Therefore, a relatively high error rate can be tolerated on the reverse link.

On the other hand, if the forward link is of poor quality such that more or less frequent retransmissions of data will likely be required, a larger amount of radio resources should be assigned for feedback messages on the reverse link to ensure that these messages are received and decoded correctly by the data sender and retransmissions are made only when needed. It has also been recognized that it is typically more important to get across a NACK correctly than an ACK for a received piece of data, since if a transmitted NACK is incorrectly interpreted as an ACK by the data sending node, the data will not be retransmitted and the data will be erroneous and therefore lost at the data receiving node which can be seen as a significant drawback that may be unacceptable.

Conversely, if a transmitted ACK is incorrectly interpreted as a NACK by the data sending node, the data will be retransmitted once in vain since the data had already been correctly received by the data receiving node, which is only a minor drawback of wasted resources for one retransmission that may be tolerable. Therefore, the error rate on the reverse link could preferably be measured as the "NACK to ACK" error rate and a NACK should be considered to be received unless an ACK has been positively received.

In the following description, the error rate for reception of data on the forward link will be referred to as the "data error rate", and the error rate for reception of feedback messages on the reverse link will be referred to as the "feedback error rate".

An example of a method, performed by a network node of a radio network when the solution is employed, will now be described with reference to the flow chart in FIG. 3. In this method, the network node is operable for handling a feedback procedure requiring transmission of feedback messages on a reverse link to indicate either an ACK or a NACK of correct reception of data transmitted on a forward link in a radio communication with a wireless device. In a possible embodiment, the feedback procedure may comprise a HARQ process.

A first action 300 illustrates that the network node obtains a quality of the forward link. This means basically that the network node obtains a suitable parameter that indicates or implies the quality of radio signals received by the data receiving node from the data sending node on the forward link. For example, if the network node is the data receiving node it may itself measure the quality of signals transmitted from the wireless device, or if the network node alternatively is the data sending node it may order the wireless device to measure and report the quality of signals transmitted from the network node.

In a possible embodiment, the quality of the forward link may be obtained in this action by acquiring measurements of a signal-to-noise ratio, SNR, for transmissions on the forward link. In this context, the commonly used term SNR should be understood as the ratio between the "wanted" signals from the data sending node and any "unwanted" energy reception which may include noise as well as any interfering signals that happens to be received as well if present. Throughout this description, the term SNR can therefore be exchanged with signal-to-interference-and-noise ratio, SINR, which is another commonly used term in this field. However, other ways of obtaining the quality of the forward link are also possible for this solution such as measuring Bit Error Rate, BER or measuring Block Error Rate, BLER, or by any combination of the above alternatives, and this embodiment is not limited to any particular parameter(s) indicating quality of the forward link.

In a further action 302, the network node determines an expected data error rate in reception of the data on the forward link based on the quality of the forward link obtained in action 300. For example, the expected data error rate may be determined if the SNR is known according to the above-described embodiment, by using a so-called Q-function which is well-known in the art. In the field of statistics, the Q-function generally describes a tail probability of a standard normal (Gaussian) distribution. In this context of applying a Q-function for determining the expected data error rate on the forward link, the following Q-function may be employed:

$$Q\left(\frac{1}{2}\sqrt{\frac{Eb}{N0}}\right)$$

where Eb is received energy per bit and N0 is the noise which may, as said above, include interference if present. The ratio Eb/N0 can thus be regarded as a useful measure or quantity of the SNR. Any other suitable way of determining the expected data error rate may also be used and the solution is not limited in this respect.

An optional action 304, illustrates that the network node may set a maximum acceptable limit of a feedback error rate in reception of the feedback messages on the reverse link based on the expected data error rate, according to another possible embodiment. The maximum acceptable limit of a feedback error rate may be used as a basis for assigning radio resources on the reverse link for transmission of the feedback messages, which will be described later below.

As indicated above, it has been recognized in this solution that retransmissions are not likely to be required if the forward link is of sufficiently high quality and the expected data error rate is relatively low, and conversely that more or less frequent retransmissions of data will likely be required if the forward link is of poor quality and the expected data error rate is thus relatively high. In the former case, a relatively high feedback error rate can be tolerated on the reverse link since very few, if any, retransmissions will be needed anyway and the maximum acceptable limit of the feedback error rate may therefore be set relatively high. In the latter case, a lower feedback error rate is required on the reverse link since retransmissions will frequently be needed and it is therefore more important to ensure correct interpretation of the feedback messages. The maximum acceptable limit of the feedback error rate may therefore be set relatively low in the latter case.

A following action 306 illustrates that the network node assigns radio resources on the reverse link for transmission of the feedback messages based on the expected data error rate. This is done so that more radio resources are assigned for the reverse link when the expected data error rate is relatively high than when the expected data error rate is relatively low. Conversely, this also means that less radio resources will be assigned for the reverse link when the expected data error rate is relatively low than when the expected data error rate is relatively high. In this way, the solution provides a mapping between the expected data error rate and the radio resources needed for the reverse link for handling the feedback procedure to meet the expected data error rate. This mapping may be made directly, e.g. by means of a preconfigured mapping table or the like, or indirectly by using the above-mentioned maximum acceptable limit of the feedback error rate as follows.

If action 304 is employed, the network node may determine the maximum acceptable limit of the feedback error rate to be relatively low when the expected data error rate is high, and may conversely determine the maximum acceptable limit of the feedback error rate to be relatively high when the expected data error rate is low. In this embodiment, the network node assigns radio resources on the reverse link for transmission of the feedback messages such that the feedback error rate on the reverse link is below the above-described maximum acceptable limit. Consequently, a relatively low maximum acceptable limit of the feedback error rate requires relatively large amount of radio resources on the reverse link in order to meet the maximum acceptable limit, while a relatively small amount of radio resources on the reverse link is sufficient when the maximum acceptable limit of the feedback error rate is relatively high.

In another possible embodiment, the amount of radio resources assigned for the reverse link is reduced if the expected data error rate decreases. Thereby, the usage of radio resources can be made more efficient by this embodiment since it can be avoided that an excessive amount radio resources will be assigned to no avail when they are not really needed due to the decreased data error rate. In another possible embodiment, the network node assigns a first amount of radio resources for the reverse link if the expected data error rate is below a first threshold, and assigns at least a second amount of radio resources larger than the first amount of radio resources for the reverse link if the expected data error rate is above the first threshold.

Figure 3:
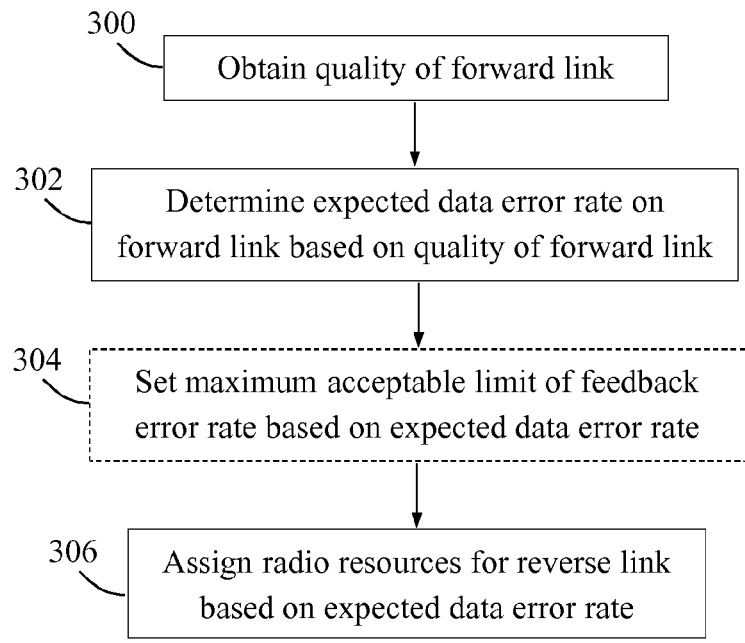
FIG. 3 is a flow chart illustrating a procedure in a network node, according to some possible embodiments.

The procedure of FIG. 3 implies that the amount of radio resources to assign on the reverse link is dependent on the expected data error rate on the forward link. In some embodiments described herein, the amount of radio resources to assign on the reverse link is dependent on the data error rate in a step-like fashion. This is illustrated by exemplifying flow charts in FIGS. 4 and 5 and by the diagram shown in FIG. 6, to be described below.

Figure 4:
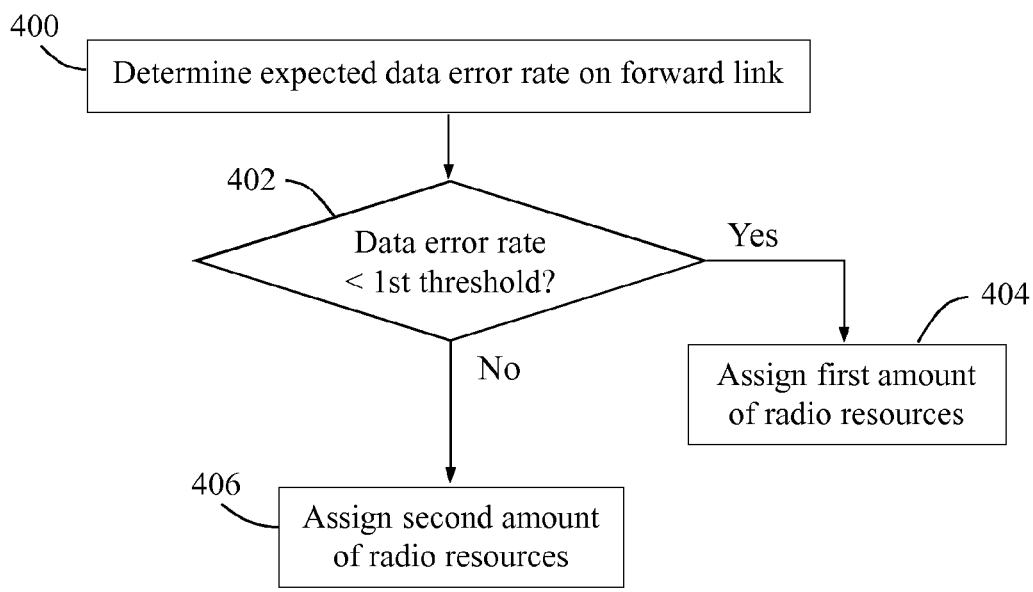
FIG. 4 is a flow chart illustrating an example of how a network node may assign radio resources, according to further possible embodiments.

Starting with the procedure of FIG. 4, the network node determines the expected data error rate on the forward link in a first shown action 400, based on an obtained quality of the forward link, thus corresponding to actions 300 and 302 in FIG. 3. In a next action 402, the network node determines whether the expected data error rate is below a preset threshold value, here called a first threshold. If so, the network node assigns a first amount of radio resources for the reverse link in an action 404 which should match the relatively low expected data error rate. It is an advantage that no more radio resources are assigned than warranted given the expected data error rate.

On the other hand, if the expected data error rate is higher and not below the first threshold, the network node assigns a second amount of radio resources for the reverse link in an action 406 which is larger than the first amount of radio resources to match to the higher expected data error rate, as explained above. In this case it is an advantage that a greater amount of radio resources is assigned for the reverse link to meet the expected data error rate and the need for achieving a lower feedback error rate to ensure correct reception of data.

FIG. 4 thus illustrates an example when the network node can assign either of two levels of radio resources for different data error rates in relation to the first threshold. In another possible embodiment, the network node may assign a third amount of radio resources larger than the second amount of radio resources for the reverse link if the expected data error rate is above a second threshold that is greater than the first threshold. This embodiment is illustrated by the flow chart in FIG. 5 which is basically an extension of the procedure of FIG. 4. Reference will also be made to FIG. 6 which shows how the amount of assigned radio resources can vary in a step-like fashion depending on the expected data error rate.

A first action 500 illustrates that the network node determines the expected data error rate on the forward link, i.e. same as action 400. The following action 502 further corresponds to action 402 as the expected data error rate is compared to the first threshold. In action 504, the network node assigns a first amount of radio resources "R1" for the reverse link if the expected data error rate on the forward link is below the first threshold "Th1", likewise corresponding to action 404 above.

If the expected data error rate is not below the first threshold in action 502, the network node proceeds to compare the expected data error rate to a second threshold "Th2" which is greater than the first threshold Th1, in a further action 506. If the data error rate is not greater than the second threshold Th2 in this action, i.e. the expected data error rate has a value somewhere between the first and second thresholds Th1, Th2, the network node assigns a second amount of radio resources "R2" for the reverse link in an action 508, which is larger than the first amount of radio resources R1, see also the interval between Th1 and Th2 in FIG. 6.

On the other hand, if the data error rate is greater than the second threshold Th2 in action 506, i.e. the expected data error rate has a value above the second threshold Th2, the network node assigns at least a third amount of radio resources "R3" for the reverse link in an action 510, which is larger than the second amount of radio resources R2, see also the interval above Th2 in FIG. 6. Even if the example in FIG. 5 involves selection of three different amounts of radio resources R1, R2 and R3 depending on the expected data error rate relative two thresholds Th1 and Th2, the selection of radio resources can be extended still further to involve further thresholds and different amounts of radio resources to assign for the reverse link. FIG. 6 thus illustrates yet another threshold "Th3" and that a fourth amount of radio resources "R4" larger than the third amount of radio resources R3, can be assigned for the reverse link if the expected data error rate is above Th3, see the interval above Th3 in FIG. 6. Hence, any number of resource amounts and thresholds may be employed using the principle described for FIGS. 4-6 above.

Some further possible embodiments and features that may be employed in the network node will now be outlined. For example, more than one retransmission attempt may be made in case the data receiving node does not manage to receive and decode the data correctly and continue to send a NACK to the data sending node. The network node may therefore determine how many retransmission attempts to apply in the radio communication in the case of NACK, so as to limit the retransmission attempts to a maximum number. In another possible embodiment, the network node may assign a greater amount of radio resources for a first transmission of feedback than for a subsequent transmission of feedback on the reverse link. It may thus be assumed that the probability that a feedback message is ultimately received correctly at the data sending node increases with each repeated retransmission attempt and subsequent feedback message. Therefore, less amounts of radio resources can be assigned for each subsequent transmission of feedback on the reverse link, in order to save consumption of radio resources and still achieve reduced feedback error rate so that it does not exceed the above-mentioned maximum acceptable limit. This embodiment will be discussed further below with reference to a diagram in FIG. 11.

It is also possible that the network node may use an instantaneous or latest known short-term quality measurement of the forward link as a basis for assigning radio resources on the reverse link for feedback to a first transmission of data. The network node may then use more long-term quality measurements of the forward link as a basis for assigning radio resources on the reverse link for feedback to one or more subsequent retransmissions of the same data. The short-term quality measurement may be made on the first transmission of the data while the long-term quality measurements may comprise several measurements made over time.

In another possible embodiment, the feedback error rate may be a NACK to ACK error rate for when NACK is erroneously interpreted as ACK. As mentioned above, when the data sending node erroneously interprets a NACK as an ACK, the data will not be retransmitted and is therefore lost at the data receiving node which is regarded to be a major drawback. It is only a minor drawback when the data sending node erroneously interprets an ACK as a NACK, since the data is correctly received but will be retransmitted without need thus causing a minor waste of resources. This embodiment will be discussed further below with reference to a diagram in FIG. 10. In another possible embodiment, a NACK is considered to be received unless an ACK has been positively received, thereby "skewing" the data receiving node to return a NACK when unsure of whether the data has been correctly received or not in order to avoid loss of data.

In another possible embodiment, the network node may assign radio resources for the reverse link further based on a maximum number of allowed retransmissions, e.g. with reduced amounts of radio resources for feedback to each subsequent retransmission attempt as suggested above.

Figure 7:
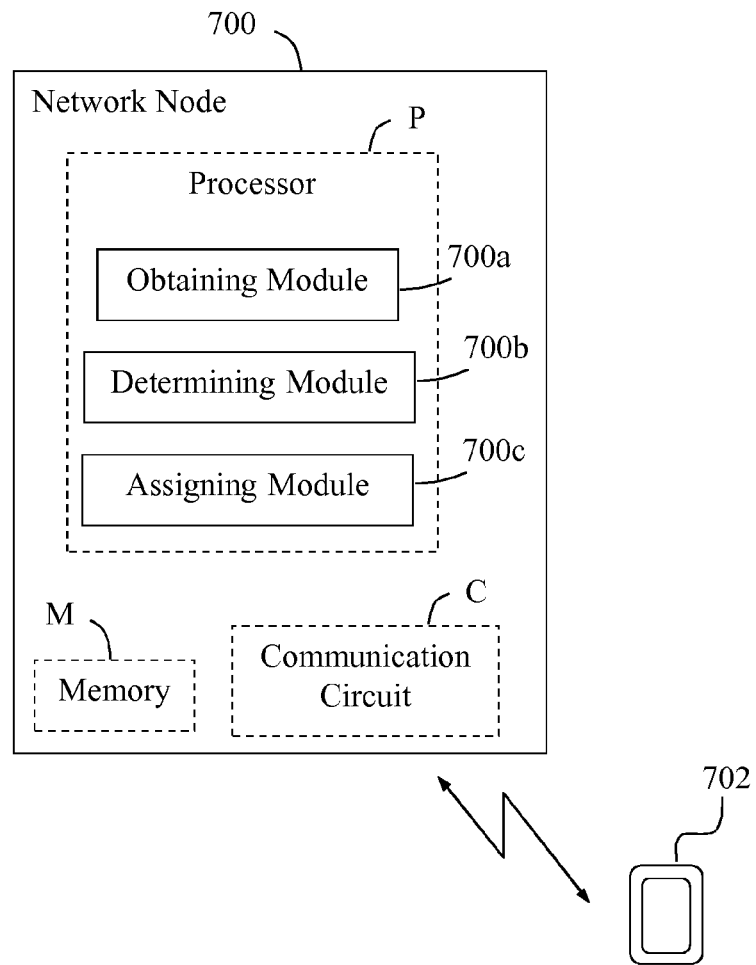
FIG. 7 is a block diagram illustrating a network node in more detail, according to further possible embodiments.

The block diagram in FIG. 7 illustrates a detailed but non-limiting example of how a network node 700 may be structured to bring about the above-described solution and embodiments thereof. In this figure, the network node 700 may thus be configured to operate according to any of the examples and embodiments of employing the solution as described above, where appropriate, and as follows. The network node 700 is shown to comprise a processor "P", a memory "M" and a communication circuit "C" with suitable equipment for transmitting and receiving signals with data and messages in the manner described herein.

The communication circuit C in the network node 700 thus comprises equipment configured for communication with a wireless device 702 over a radio interface using a suitable protocol for radio communication depending on implementation. The network node 700 comprises means configured or arranged to perform at least some of the actions 300-306, 400-406 and 500-510 of the flow charts in FIGS. 3, 4 and 5, respectively, in the manner described above. These actions may be performed by means of functional modules in the processor P in the network node 700 as follows.

The network node 700 is arranged to handle a feedback procedure requiring transmission of feedback messages on a reverse link to indicate either an acknowledgement, ACK, or a non-acknowledgement, NACK, of correct reception of data transmitted on a forward link in a radio communication with a wireless device.

The network node 700 comprises means configured to obtain a quality of the forward link. This obtaining activity may be performed by an obtaining module 700a in the network node 700, e.g. in the manner described for action 300 above. The network node 700 also comprises means configured to determine an expected data error rate in reception of the data on the forward link based on the quality of the forward link. This determining activity may be performed by a determining module 700b in the network node 700, e.g. in the manner described for action 302 above.

The network node 700 further comprises means configured to assign radio resources on the reverse link for transmission of the feedback messages based on the expected data error rate, so that more radio resources are assigned for the reverse link when the expected data error rate is relatively high than when the expected data error rate is relatively low. This assigning activity may be performed by an assigning module 700c in the network node 700, e.g. in the manner described for action 306 above.

The network node 700 may further comprise means configured to set a maximum acceptable limit of a feedback error rate in reception of the feedback messages on the reverse link based on the expected data error rate so that the maximum acceptable limit of the feedback error rate is low when the expected data error rate is high, and vice versa. The network node 700 may then assign radio resources on the reverse link for transmission of the feedback messages such that the feedback error rate on the reverse link is below the maximum acceptable limit. This activity may be performed by the determining module 700b, e.g. in the manner described for action 304 above.

It should be noted that FIG. 7 illustrates some possible functional modules in the network node 700 and the skilled person is able to implement these functional modules in practice using suitable software and hardware. Thus, the solution is generally not limited to the shown structures of the network node 700, and the functional modules 700a-c may be configured to operate according to any of the features described in this disclosure, where appropriate.

Figure 5:
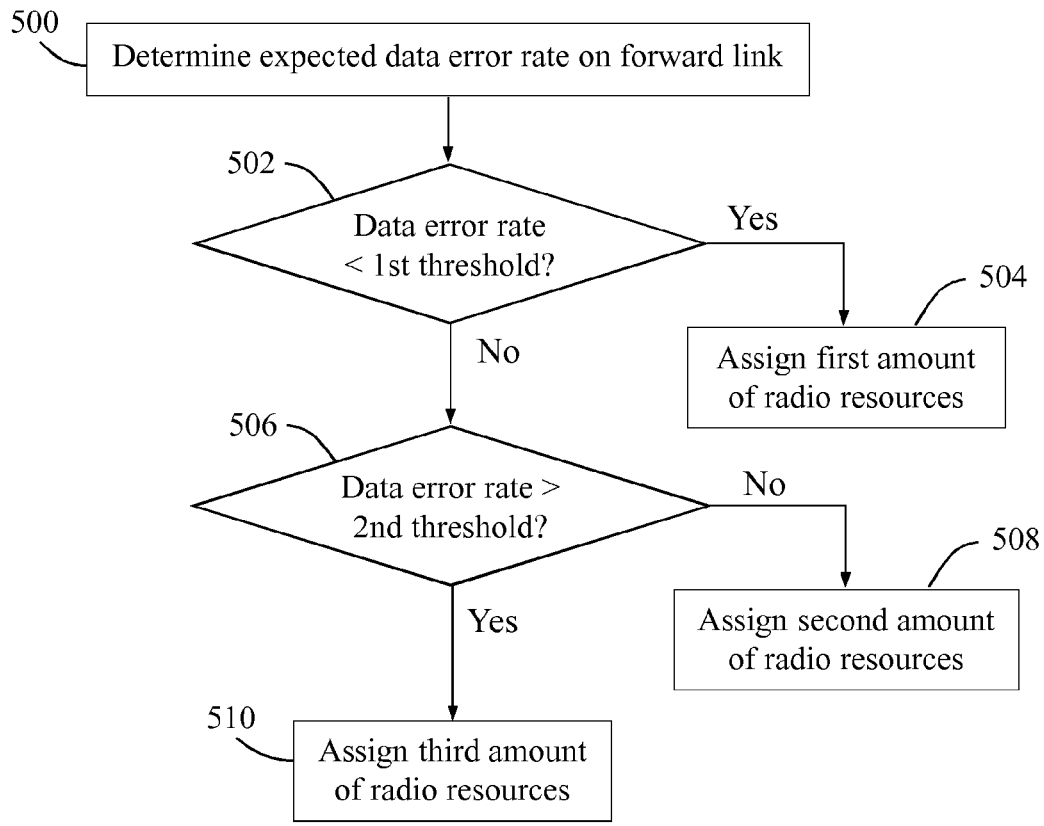
FIG. 5 is a flow chart illustrating another example of how a network node may assign radio resources, according to further possible embodiments.
Figure 6:
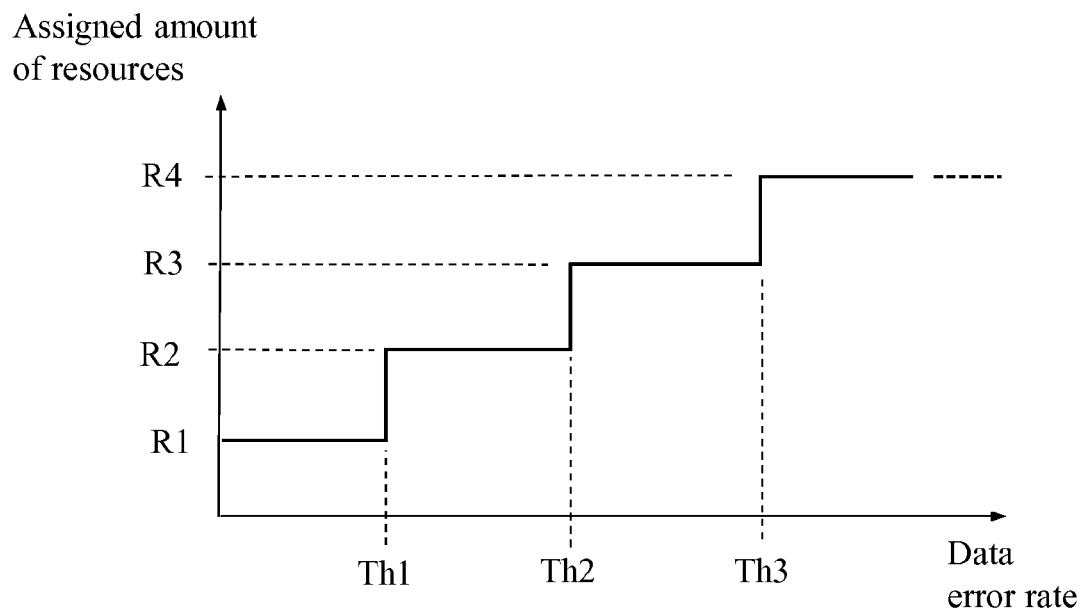
FIG. 6 is a diagram illustrating how a network node may assign radio resources, according to further possible embodiments.

The embodiments and features described herein may thus be implemented in a computer program comprising instructions which, when executed on at least one processor, cause the at least one processor to carry out the above actions e.g. as described for any of FIGS. 3, 4 and 5. Further, the above-described embodiments may be implemented in a carrier containing the above computer program, wherein the carrier is one of an electronic signal, optical signal, radio signal, or computer readable storage medium. The computer readable storage medium may be a compact disc or other carrier suitable for holding the computer program. Some examples of how the computer program and the carrier can be realized in practice are outlined below, and with further reference to FIG. 7.

The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

The memory M may comprise the above-mentioned computer readable storage medium or carrier on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM). The program modules could in alternative embodiments be distributed on different computer program products in the form of memories within the network node 700.

It is an advantage of the above-described solution and its embodiments that unnecessary occupation of radio resources can be avoided by not assigning more than necessary radio resources for feedback messages in case the forward link is of relatively high quality such that retransmissions are not likely to be required and a relatively high error rate can be tolerated on the reverse link. Another advantage is that the amount of radio resources assigned for feedback messages will still be sufficient to ensure that these messages are received and decoded correctly by the data sending node in case the forward link is of poor quality, and that retransmissions are made only when needed.

Figure 8:
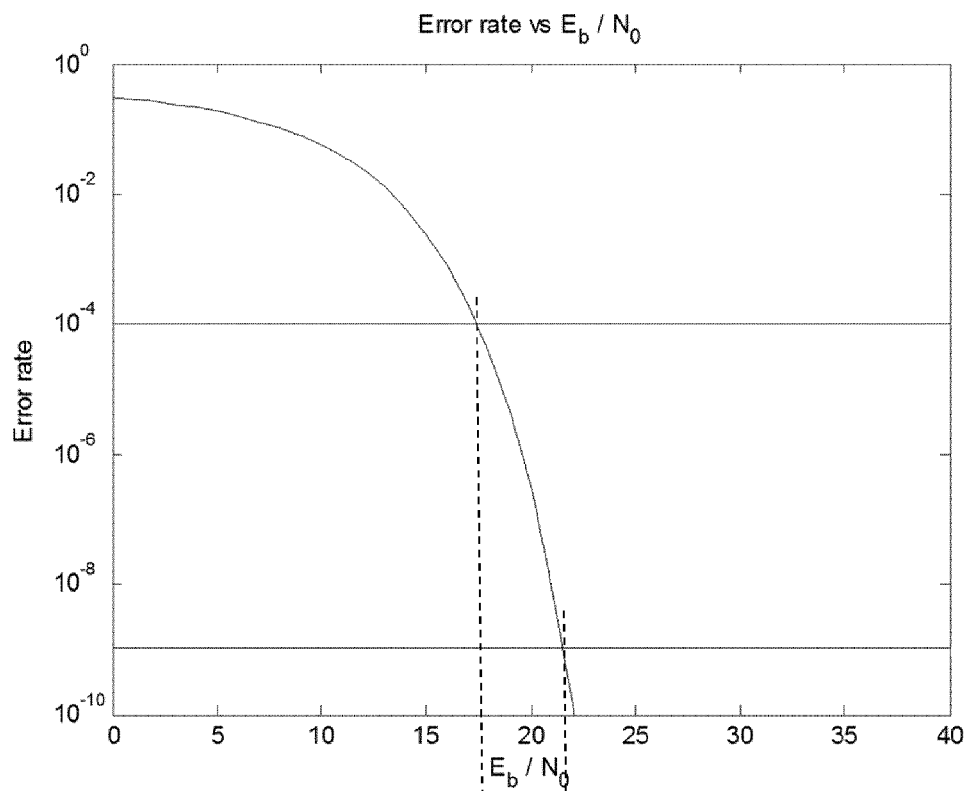
FIG. 8 is a diagram illustrating how error rate on a radio link is dependent on signal-to-noise ratio.
Figure 9:
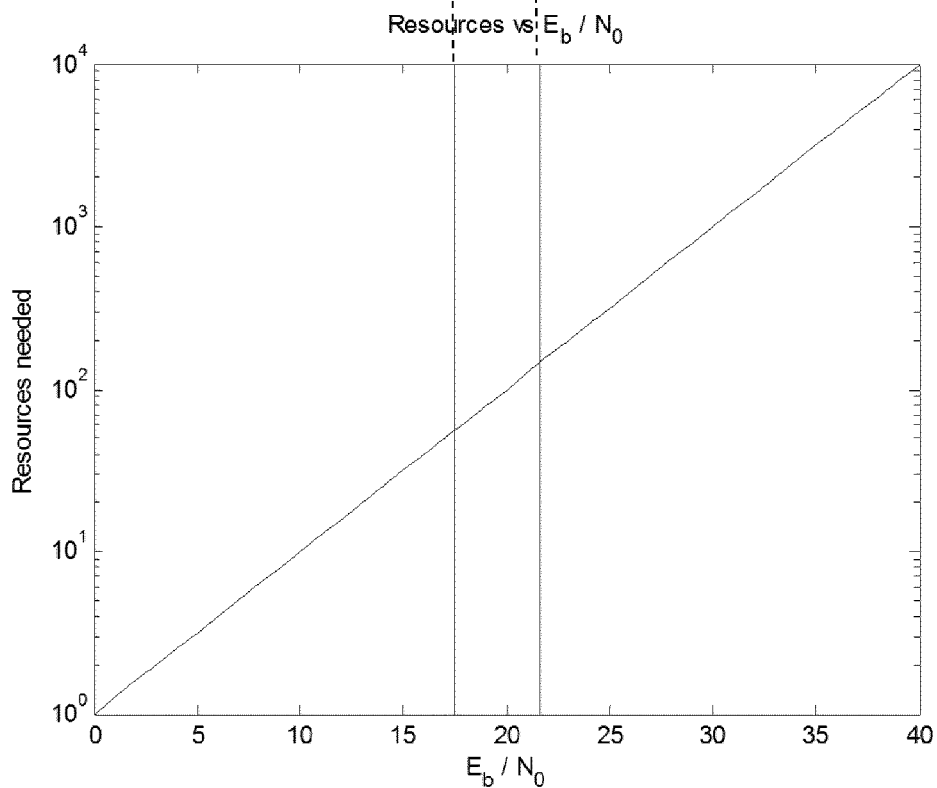
FIG. 9 is a diagram illustrating how the need for radio resources on a radio link is dependent on a desired signal-to-noise ratio.

The diagram in FIG. 8 illustrates how the error rate on a radio link is generally dependent on signal quality in terms of SNR which is represented in the figure by the above-mentioned ratio Eb/N0 as measured in dB. The error rate can be determined by using the above-mentioned Q-function. This figure further illustrates which values of the SNR are required to achieve two different values of the error rate, $10^{-4}$ and $10^{-9}$. The radio resources needed to achieve these two SNRs can be read from FIG. 9 which illustrates how resources needed depend on SNR, in this case Eb/N0. It can be seen in this figure that the lower error rate of $10^{-9}$ requires a relatively higher SNR and a significantly larger amount of radio resources than the higher error rate of $10^{-4}$. Roughly three times more radio resources are needed to achieve the lower error rate of $10^{-9}$ as compared to the higher error rate of $10^{-4}$.

It was mentioned above that the feedback error rate should be measured as a NACK to ACK error rate for when NACK is erroneously interpreted as ACK, since in that case the data will not be retransmitted and is therefore lost at the data receiving node. It has also been mentioned that a NACK should be considered to be received by the data sending node unless an ACK is positively received.

Figure 10:
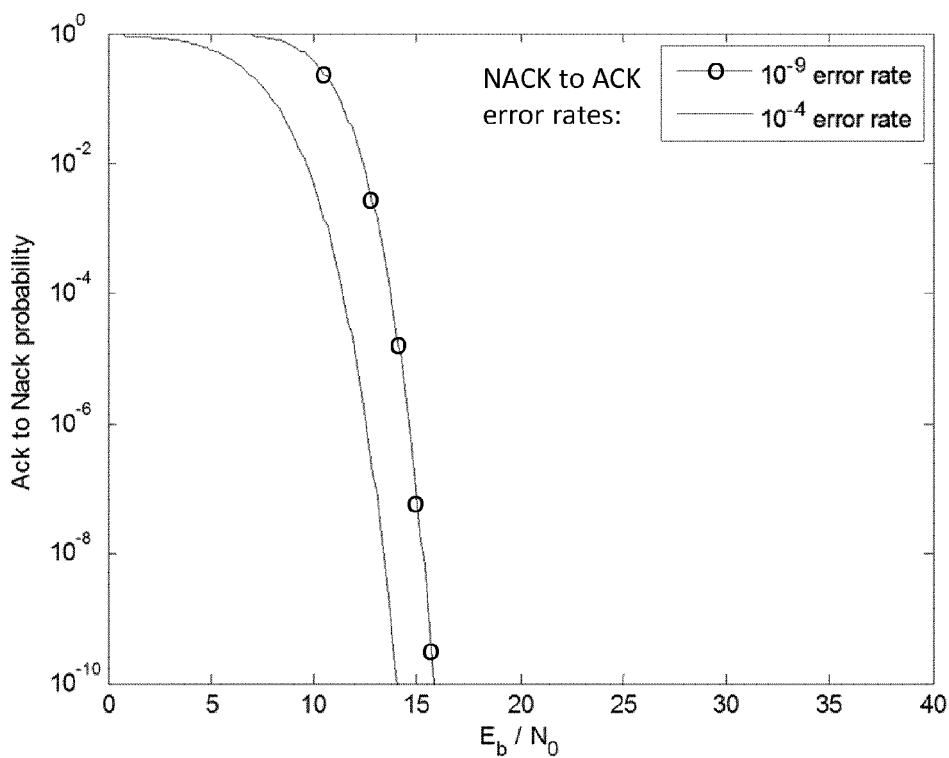
FIG. 10 is a diagram illustrating how ACK to NACK probability is dependent on signal-to-noise ratio for an error rate of $10^{-4}$ and for an error rate of $10^{-9}$, respectively.

The diagram in FIG. 10 shows how ACK to NACK probability or rate is dependent on SNR represented by Eb/N0 in dB, for the error rate of $10^{-4}$ (the curve to the left) and for the lower error rate of $10^{-9}$ (the curve to the right), respectively. It can be seen in this figure that a higher SNR, and therefore more radio resources, is needed for the error rate of $10^{-9}$ than for the error rate of $10^{-4}$, to achieve the same ACK to NACK probability. Hence, if the NACK to ACK error rate of $10^{-9}$ is required, about twice the amount of radio resources are need as compared to when the NACK to ACK error rate of $10^{-4}$ is required for a given ACK to NACK probability or rate.

Figure 11:
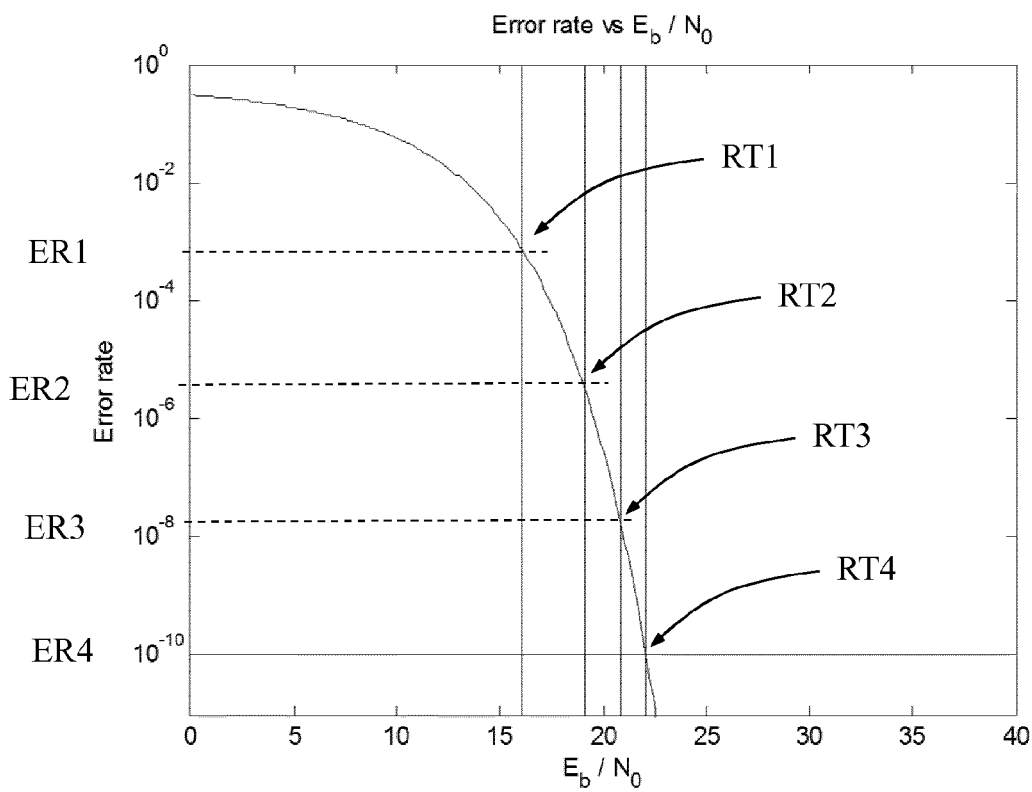
FIG. 11 is a diagram illustrating how different error rates can be achieved for different numbers of allowed retransmissions.

Finally, the diagram in FIG. 11 shows how different error rates can be achieved when employing different numbers of retransmission attempts. The curve therein shows how the error rate on a radio link is generally dependent on signal quality in terms of SNR represented by Eb/N0 in dB, which is similar to the curve in FIG. 8. Four different numbers of retransmission attempts are shown as RT1-RT4. It can be understood that each added retransmission attempt increases the SNR which is marked by the four values of SNR in the figure which provide four different values of resulting feedback error rate as follows.

When one retransmission attempt is employed at "RT1" the resulting feedback error rate "ER1" is $7.3 \times 10^{-3}$. Further, when two retransmission attempts are employed at "RT2" the resulting lower feedback error rate "ER2" is $3.4 \times 10^{-6}$, when three retransmission attempts are employed at "RT3" the resulting still lower feedback error rate "ER3" is $1.8 \times 10^{-8}$, and finally when four retransmission attempts are employed at "RT4" the resulting lowest feedback error rate "ER4" is $1 \times 10^{-10}$.

It should be noted that in this example, the SNR is increased, as marked by the four SNR values in the figure, to a lesser degree with each added retransmission attempt. It was mentioned above that the network node may assign radio resources for the reverse link with reduced amounts of radio resources for feedback to each subsequent retransmission attempt. Thus, the increase of SNR, and corresponding need for increased amount of radio resources, is less from RT2 to RT3 than from RT1 to RT2, and it is even lesser from RT3 to RT4 than from RT2 to RT3. For a conventional resource assignment, the feedback error rate is typically around $1.2 \times 10^{-6}$. Using the above-described example of employing this solution, the resource assignment for feedback messages would instead be adaptively picked for the different retransmission attempts so that the usage of radio resources can be more efficient and even optimized. In most radio technologies, the choice of the amount of resources for feedback messages is made step-wise in discreet intervals, e.g. corresponding to different numbers of assigned frequency resources.

While the solution has been described with reference to specific exemplifying embodiments, the description is generally only intended to illustrate the inventive concept and should not be taken as limiting the scope of the solution. For example, the terms "network node", "wireless device", "feedback message" and "radio resources" have been used throughout this disclosure, although any other corresponding entities, functions, and/or parameters could also be used having the features and characteristics described here. The solution is defined by the appended claims.

The invention claimed is:

1. A method performed by a network node of a radio network, for handling a feedback procedure requiring a transmission of feedback messages on a reverse link to indicate either an acknowledgement (ACK) or a non-acknowledgement (NACK) of correct reception of data transmitted on a forward link in a radio communication with a wireless device, the method comprising:
   obtaining a quality of the forward link;
   determining an expected data error rate in reception of the data on the forward link based on the quality of the forward link; and
   assigning radio resources on the reverse link for the transmission of the feedback messages based on the expected data error rate, so that more radio resources are assigned for the reverse link for the transmission of the feedback messages when the expected data error rate is relatively high than when the expected data error rate is relatively low, wherein assigning the radio resources on the reverse link for the transmission of the feedback messages based on the expected data error rate comprises:
      comparing the expected data error rate with a first threshold;
      assigning a first amount of radio resources for the reverse link for the transmission of the feedback messages when the expected data error rate is below the first threshold;
      comparing the expected data rate with a second threshold greater than the first threshold when the expected data error rate is equal to or above the first threshold; and
      assigning a second amount of radio resources larger than the first amount of radio resources for the reverse link for the transmission of the feedback messages when the expected data error rate is equal to or above the first threshold and below the second threshold,
   wherein the network node sets a maximum acceptable limit of a feedback error rate in reception of the feedback messages on the reverse link based on the expected data error rate so that the maximum acceptable limit of the feedback error rate is low when the expected data error rate is high and vice versa, and wherein the network node assigns the radio resources on the reverse link for the transmission of the feedback messages such that the feedback error rate on the reverse link is below the maximum acceptable limit.

2. The method according to claim 1, wherein an amount of radio resources assigned for the reverse link for the transmission of the feedback messages is reduced, if the expected data error rate decreases.

3. The method according to claim 1, wherein the network node assigns a third amount of radio resources larger than the second amount of radio resources for the reverse link for the transmission of the feedback messages, if the expected data error rate is above the second threshold greater than the first threshold.

4. The method according to claim 1, wherein the network node assigns a greater amount of radio resources for a first transmission of the feedback messages than for a subsequent transmission of the feedback messages on the reverse link.

5. The method according to claim 1, wherein the network node obtains the quality of the forward link by measurements of a signal-to-noise ratio (SNR) for transmissions on the forward link.

6. The method according to claim 1, wherein the feedback error rate is a NACK to ACK error rate, when the NACK is erroneously interpreted as the ACK.

7. The method according to claim 6, wherein the NACK is considered to be received unless the ACK has been positively received.

8. The method according to claim 1, wherein the network node assigns the radio resources for the reverse link for the transmission of the feedback messages further based on a maximum number of allowed retransmissions.

9. The method according to claim 1, wherein the feedback procedure comprises a Hybrid Automatic Repeat Request (HARQ) process.

10. A network node of a radio network, arranged to handle a feedback procedure requiring a transmission of feedback messages on a reverse link to indicate either an acknowledgement (ACK) or a non-acknowledgement (NACK) of correct reception of data transmitted on a forward link in a radio communication with a wireless device, the network node comprising:
   a processor; and
   memory, said memory storing instructions executable by said processor, whereby the network node is configured to:
      obtain a quality of the forward link;
      determine an expected data error rate in reception of the data on the forward link based on the quality of the forward link;
      assign radio resources on the reverse link for the transmission of the feedback messages based on the expected data error rate, so that more radio resources are assigned for the reverse link for the transmission of the feedback messages when the expected data error rate is relatively high than when the expected data error rate is relatively low, wherein, to assign the radio resources on the reverse link for the transmission of the feedback messages based on the expected data error rate, the memory stores instructions, whereby the network node is configured to:
         compare the expected data error rate with a first threshold;
         assign a first amount of radio resources for the reverse link for the transmission of the feedback messages when the expected data error rate is below the first threshold;
         compare the expected data rate with a second threshold greater than the first threshold when the expected data error rate is equal to or above the first threshold; and
         assign a second amount of radio resources larger than the first amount of radio resources for the reverse link for the transmission of the feedback messages when the expected data error rate is equal to or above the first threshold and below the second threshold;
      set a maximum acceptable limit of a feedback error rate in reception of the feedback messages on the reverse link based on the expected data error rate so that the maximum acceptable limit of the feedback error rate is low when the expected data error rate is high and vice versa; and assign the radio resources on the reverse link for the transmission of the feedback messages such that the feedback error rate on the reverse link is below the maximum acceptable limit.

11. The network node according to claim 10, wherein the memory further stores instructions, whereby the network node is configured to reduce an amount of radio resources assigned for the reverse link for the transmission of the feedback messages, if the expected data error rate decreases.

12. The network node according to claim 10, wherein the memory further stores instructions, whereby the network node is configured to assign a third amount of radio resources larger than the second amount of radio resources for the reverse link for the transmission of the feedback messages, if the expected data error rate is above the second threshold greater than the first threshold.

13. The network node according to claim 10, wherein the memory further stores instructions, whereby the network node is configured to assign a greater amount of radio resources for a first transmission of the feedback messages than for a subsequent transmission of the feedback messages on the reverse link.

14. The network node according to claim 10, wherein the memory further stores instructions, whereby the network node is configured to obtain the quality of the forward link by measurements of a signal-to-noise ratio (SNR) for transmissions on the forward link.

15. The network node according to claim 10, wherein the feedback error rate is a NACK to ACK error rate, when the NACK is erroneously interpreted as the ACK.

16. The network node according to claim 15, wherein the NACK is considered to be received unless the ACK has been positively received.

17. The network node according to claim 10, wherein the memory further stores instructions, whereby the network node is configured to assign the radio resources for the reverse link for the transmission of the feedback messages further based on a maximum number of allowed retransmissions.

18. The network node according to claim 10, wherein the feedback procedure comprises a Hybrid Automatic Repeat Request (HARQ) process.

* * * * *